United States Patent
Maillet

[11] Patent Number: 5,839,520
[45] Date of Patent: Nov. 24, 1998

[54] METHOD OF DRILLING WELL BORES

[76] Inventor: Bonnie Blue Maillet, 130 Oak Leaf Dr., Lafayette, La. 70503

[21] Appl. No.: 724,779

[22] Filed: Oct. 3, 1996

[51] Int. Cl.$^6$ .............. E21B 7/04; E21B 31/00; C09K 7/00

[52] U.S. Cl. .............. 175/61; 175/62; 175/65; 507/140; 507/906; 166/301

[58] Field of Search ............... 507/906, 140; 166/301; 175/61, 62, 65

[56] References Cited

U.S. PATENT DOCUMENTS

| | | | |
|---|---|---|---|
| 2,943,679 | 7/1960 | Scott et al. | 166/285 |
| 3,155,162 | 11/1964 | Flickinger et al. | 166/280 |
| 3,216,933 | 11/1965 | Park et al. | 507/143 |
| 4,063,603 | 12/1977 | Rayborn | 175/65 |
| 4,123,367 | 10/1978 | Dodd | 252/8.5 B |
| 4,247,403 | 1/1981 | Foley et al. | 175/72 |
| 4,269,279 | 5/1981 | House | 175/66 |
| 4,423,791 | 1/1984 | Moses | 175/65 |
| 4,643,264 | 2/1987 | Dellinger | 175/61 |
| 4,862,975 | 9/1989 | Maillet et al. | 507/104 |
| 5,096,883 | 3/1992 | Mercer et al. | 507/103 |
| 5,330,005 | 7/1994 | Cord et al. | 166/280 |
| 5,439,055 | 8/1995 | Cord et al. | 166/280 |
| 5,501,275 | 3/1996 | Cord et al. | 166/280 |

OTHER PUBLICATIONS

Drilling and Drilling FLuids, Chilingarion et al. (1983).

*Primary Examiner*—C. H. Kelly
*Attorney, Agent, or Firm*—Domingue, Delaune & Waddell

[57] ABSTRACT

A method of increasing the penetration rate of a drill string within a deviated well bore is disclosed. The method includes providing a drill string with a drilling bottom hole assembly, and rotating the bit in order to create the deviated well bore as well as a filter cake on the walls of the well bore. A pill comprising a spherical bead is prepared and pumped down into the well bore. The pill is allowed to migrated to the low side of the bore hole so that tortuosity is reduced. A method of slide drilling, batch drilling, and running a liner in a well is also disclosed utilizing the spherical beads. In the novel methods disclosed, the spherical beads are allowed to migrate to the low side of the bore hole and are allowed to penetrate through the bore hole's filter cake.

12 Claims, 3 Drawing Sheets

METHOD OF DRILLING WELL BORES

BACKGROUND OF THE INVENTION

This invention relates to drilling fluid additives used to drill bore holes. More particularly, but not by way of limitation, this invention relates to drilling fluid additives that are usable to minimize tortuosity, facilitate batch drilling, and expedite other specialty drilling applications. The drilling fluid additive is also environmentally safe, non-toxic, and assist the drilling of highly deviated wells.

In the exploration and development of hydrocarbon reservoirs, operators are usually required to drill bore holes by means of a rotating bit. A drilling fluid is necessary in order to effectively drill the bore hole. The drilling fluid, which is sometimes called "mud", is many times a mixture of water, clay, weighting material, and certain chemical additives.

In some situations, oil is used instead of water, or alternatively, a small quantity of oil is added to the water to give the mud certain desirable properties. A drilling fluid serves very important functions. For instance, the drilling fluid is used to raise the cuttings made by the bit and lift them to the surface for disposal. But equally important, the drilling fluid also provides a means for keeping reservoir pressures in check. Since a hole full of drilling fluid exerts a hydrostatic pressure, the fluid serves as a blow-out prevention means. The heavier or denser the drilling fluid is, the more pressure it exerts. A popular weighting material is barite. Clay is added to keep the bit cuttings in suspension as they move up the bore hole. The clay also sheaths the wall of the bore hole. This thin layer of clay is called a wall cake, and makes the hole stable so it will not cave in or slough. Other chemicals are added in order give the fluid the properties needed for particular wells.

Oil has been used as a lubricant in drilling fluids for many years. The oil prevents sticking of the work string and increases rate of penetration. Oil is also useful in controlling hole erosion, which in turn causes gauge problems within the bore hole.

However, environmental concerns and government regulations have placed significant restrictions on the use of the oil-based drilling fluids. Numerous entities have attempted to solve these problems by developing environmentally acceptable oils. An example is seen in U.S. Pat. No. 5,096,883 entitled "OIL-BASE DRILLING FLUID COMPRISING BRANCHED CHAIN PARAFFINS SUCH AS THE DIMER OF 1-DECENE", assigned to Union Oil Company of California which discloses synthetic oils for use as a drilling fluid. Also, in U.S. Pat. No. 5,189,012 to Patel and assigned to M-I Drilling Fluids Company their is disclosed a synthetic hydrocarbon continuous phase used in a drilling fluid which is non-polluting and minimally toxic. Other types of additives have been developed as lubricants. For instance, in U.S. Pat. No. 4,123,367 to Dodd, a spherical glass bead is disclosed that reduces torque and drag for conventional drilling of wells. Further, in U.S. Pat. No. 4,423,791 to Moses, a method. of inhibiting differential pressure sticking of a drill string using a spherical glass bead is disclosed. These disclosures teach away from the present invention due to their method of use, placement and size.

In the drilling of modern wells (such as deviated, horizontal, and/or extended reach wells), gauge problems, sticking of the drill string, reactive torque, and hole erosion is exacerbated. Thus, there is a need for drilling fluid systems and/or additives that exhibits the necessary properties of classical drilling fluids, but will also be suitable for the unique requirements of the highly deviated and horizontal wells. There is a further need for a lubricant which can be added to a fluid system to reduce tortuosity between the dynamic work string and bore hole. There is also a need for an additive that can increase the penetration rate when drilling deviated wells during slide drilling. Also, there is a need for an effective spotting pill to facilitate the reentry of batch wells that are drilled with a first rig and then reentered with a second specialty rig.

SUMMARY OF THE INVENTION

A method of decreasing the tortuosity of a highly deviated well bore is disclosed. The method comprises having a drill string with a bottom hole assembly containing a drilling motor, a directional sub, and a bit as is well understood in the art. Next, the driller will pump a drilling fluid down the drill string that in turn causes rotation of the bit so that a well bore is created, with the rotation of the bit and its interaction with the bore hole producing tortuosity.

The driller will build the angle of inclination so that a highly deviated section is created which in turn exacerbates the tortuosity. Thereafter, a pill is prepared at the surface, the pill including 20 pounds per barrel (ppb) of spherical beads. In the preferred embodiment, the beads are glass and have a diameter of at least 800 microns. Thereafter, the driller will pump the pill within the well bore to the area of greatest tortuosity and continue drilling new sections of the well bore.

The method may further include drilling the deviated section, and preparing a sweep. The sweep comprises at least one sack (one sack equal 50 pounds) of spherical beads having a diameter of at least 800 microns; thereafter, the driller will pump the sweep within the well bore to the horizontal portion. The pumping of the sweep may occur periodically, such as once per hour. In one embodiment, the step of pumping the drilling fluid down the drill string includes creating a filter cake (also known as the mud cake) upon the well bore, the filter cake having a thickness of at least 500 microns, and in this embodiment, the spherical beads will have a diameter greater than 800 microns.

A method of reducing tortuosity of a work string within a highly deviated bore hole containing a fluid system is also disclosed. Generally, the method includes the steps of drilling a highly deviated well bore with the work string. Due to the nature of the work string and its interaction with the bore hole, tortuosity will develop. Then, according to the teachings of this invention, the driller will prepare a pill comprising of 20 ppb of spherical beads, and place the pill into the fluid stream at the surface and then pump the pill down the well so that the pill is adjacent the area creating the tortuosity, which for instance may be a severe dog leg.

This method may further include the steps of allowing the pill to settle to the bottom of the bore hole through the filter cake. The driller would rotate the work string the tortuosity is reduced due to the ball bearing effect. With the fluid system used, a filter cake may be generated having a thickness of at least 500 microns and the spherical glass bead will have a diameter of at least 800 microns. In one embodiment, the work string is a coiled tubing string that is working through a concentric stationary tubular string.

A method of increasing the penetration rate without rotation of a drill bit located on a work string in la bore hole having a fluid system is also disclosed. The method comprises the steps of rotating the bit so that the bit drills a horizontal bore hole, and thereafter, terminating the rotation of the work string. The driller will prepare a first capsule comprising 20 pounds per barrel of the spherical bead. Thereafter, the first capsule is placed into the fluid system and pumped down the well so that the capsule is adjacent the horizontal section. The first capsule is allowed to migrate to the low side of the horizontal bore hole so that the work string lays on top of the spherical beads.

The method further comprises pumping the fluid through the bit and jetting away the formation face so that new reservoir is bored. The driller advances the work string within the new bore hole by sliding on the spherical beads. The method may further include preparing a second capsule comprising the spherical beads, and placing the second capsule into the fluid system and repeating the steps noted above in order to jet away formation and advance the work string.

Also disclosed is a method of working through a tubing string with a coiled tubing work string comprising the steps of providing the tubing string, the tubing string being within a highly deviated well bore. A coiled tubing work string is provided concentrically within the tubing string. A constricted area is encountered between the coiled tubing string and tubing. The driller will prepare a sweep comprising the spherical beads and then place the sweep into the fluid system, and thereafter pumping the sweep through the work string so that the capsule is adjacent the constricted area. The sweep is allowed to migrate to the low side of the horizontal bore hole so that the work string lays on top of the spherical beads. Utilizing the rolling bearing effect, the driller may then work past the constricted area. The bead will be at least 800 microns.

Also disclosed is a method of running a liner comprising the steps of providing a deviated bore hole and running the liner to the point of constriction. The driller would then prepare a sweep comprising the spherical beads and place the sweep into the fluid system and pump the sweep through the work string so that the capsule is adjacent the horizontal section. Next, the liner is lowered into the bore hole.

In one embodiment, the step of pumping the sweep includes allowing the sweep to migrate to the low side of the horizontal bore hole so that the work string lays on top of the spherical beads, thereby supporting the pipe and then working past the constricted area by the rolling bearing effect. In one embodiment, the bore hole has a filter cake having a thickness, and said spherical beads have a diameter of at least 800 microns.

A method of batch drilling a field is disclosed. The method comprises drilling a first well with a first drilling rig and then drilling a second well with the first drilling rig. The wells may be temporarily abandoned, including placing in the first well a pill comprising spherical beads. The method would include reentering the first well with a second work string from a second drill rig and drilling a deviated section of the first well with the second drill rig.

This method of batch drilling may also include placing in the second well a pill comprising spherical beads. The driller would reenter the second well with the second drill rig and drill a deviated section of the second well with the second drill rig. In the preferred embodiment, the spherical beads comprise a glass bead having a diameter of at least 800 microns. Also, the first drill rig may be a conventional rotary drill rig and the second drill rig may be a coiled tubing unit having a drilling bottom hole assembly.

An advantage of the present invention is that the proper method of use and placement of the spherical bead will minimize tortuosity in highly deviated, extended reach, multilateral and/or horizontal well bores. Another advantage is the penetration rates of the drilling assemblies will be increased. Yet another advantage is that the method may be employed when using concentric work strings.

Still yet another advantage includes the facilitation of running liners and casing strings in highly deviated wells. Another advantage is that the drilling of batch wells may be expedited by using the method herein described. Yet another advantage is that the penetration rate during slide drilling may be increased.

A feature of the present invention is that the diameter of the spherical bead must be large enough to stick through the filter cake provided on the bore hole. Another feature of the invention is that due to the horizontal inclination of the bore holes, the gravity will segregate the spherical beads to the lower side of the bore hole.

Yet another feature of the invention is that the spherical bead will support the tubular utilized within the bore hole, such as drill strings, liners and casing when the tubular is laid-up against the bore hole. Still yet another advantage is that the spherical beads will separate two adjacent tubulars, so that metal-to-metal contact is reduced, thereby diminishing friction.

DETAILED DESCRIPTION OF PREFERRED EMBODIMENTS

Figure 1:
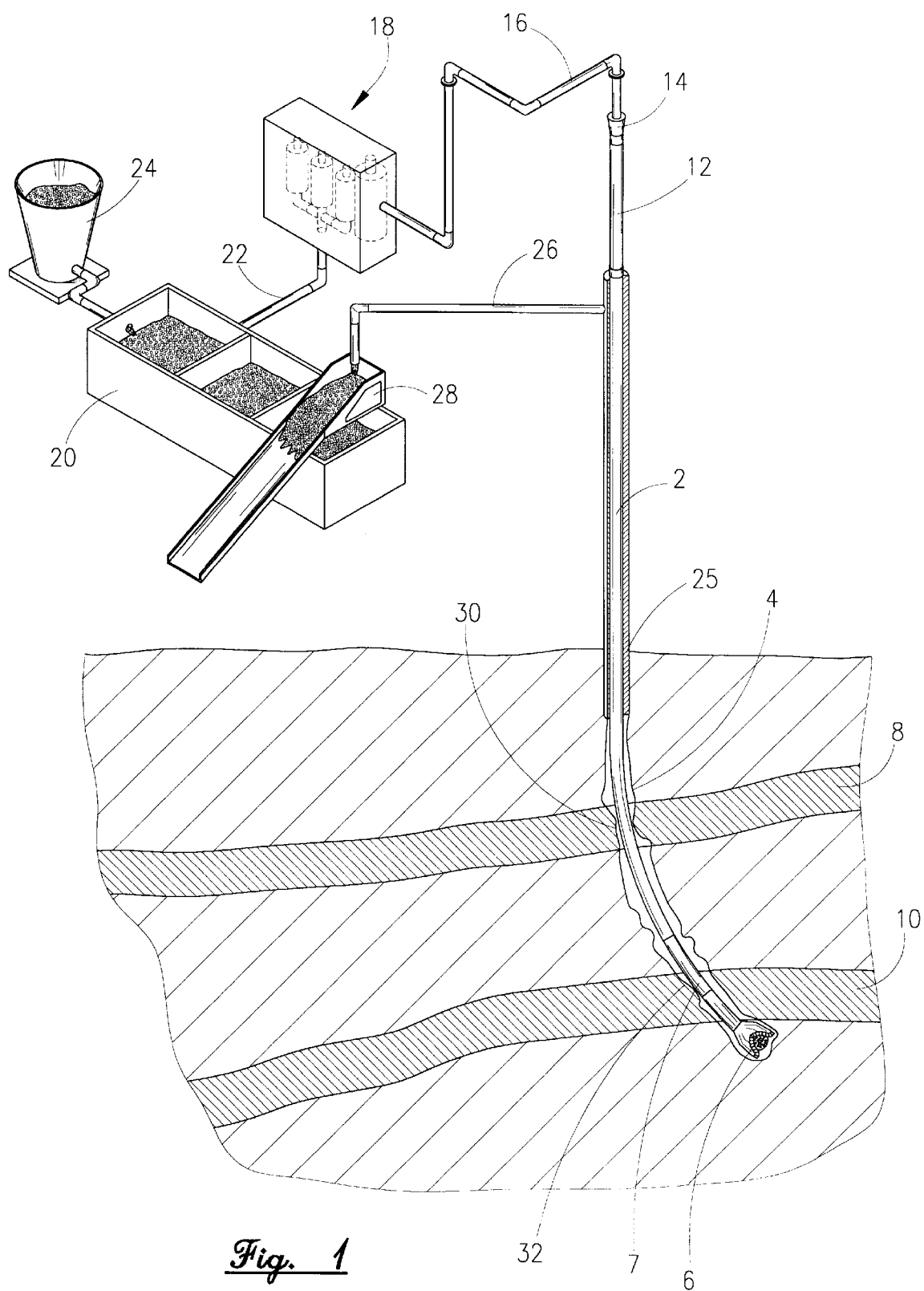
FIG. 1 depicts a work string within a bore hole with the associated components of the down hole and surface drilling fluid system.

Referring now to FIG. 1, a typical work string 2 within a drilled bore hole 4, along with some components necessary for the drilling fluid system are shown. Thus, a bit 6 will drill the bore hole 4 that will in turn intersect subterranean reservoirs 8, 10 some of which may contain hydrocarbons. The drill string may also contain a directional bottom hole assembly 7.

At the surface, the work string 2 is connected to a kelly 12 which in turn is connected to a swivel 14 which allows for rotation of the kelly and work string, but not the rotary hose 16. The rotary hose 16 is operatively connected to pumping means 18 for pumping the drilling fluid from the drilling fluid pits/tanks 20. The mud pits/tanks 20 are connected to the pumping means 18 by means of suction line 22. A mud-mixing hopper 24 is shown which serves to aid in the mixing of the various components of the drilling fluid system.

The direction of flow is from the mud tanks 20, through the pumping means 18, through the rotary hose 16 and swivel 14, down the kelly 12 and into the internal diameter of the work string 2. The drilling fluid will then exit at the bit and proceed upward through the annulus 25 created by the work string 2 and the bore hole 4. The drilling fluid will be carrying the cuttings of the bit 6. The drilling fluid exits at the mud return line 26 and from there the return fluid is passed over a shale shaker 28 for separating the solids and the fluid. This flow pattern is generally considered to be normal circulation. It is also possible to have reverse circulation which simply means that the fluid is circulated down the outer annulus 25, down past the bit 6, and up the inner diameter of the work string 2. In the reverse circulation method, the mud return line 26 is hooked-up to the pumping means 18 and the returns is taken through the kelly, as is well appreciated by those of ordinary skill in the art.

In the drilling of highly deviated well bores, the drill string 2 will be interacting with the bore hole 4. Also, with the onset of highly deviated well bores 4, drillers have begun utilizing different techniques to complete development such as batch drilling, slide drilling, and geo-steering. Due to the number of winding and twisting dog-legs inherent in the drilling of such wells, tortuosity will develop. Also, hole sloughing, hole erosion and gauge problems may develop. These problem areas are represented by numerals 30 and 32 in FIG. 1.

Tortuosity includes the effect of rotation of the bit and its reactive torque against the formation thereby causing the bit, bottom hole assembly and drill string to buckle, turn and twist within the well bore. Tortuosity effects well path, penetration rate, pipe sticking, etc. Various lubricants have, as mentioned earlier, have been developed in order to control tortuosity and increase penetration rate. The methods herein disclosed can be used to reduce tortuosity, increase penetration rates, and facilitate reentry into the highly deviated well bores thus drilled.

Figure 2:
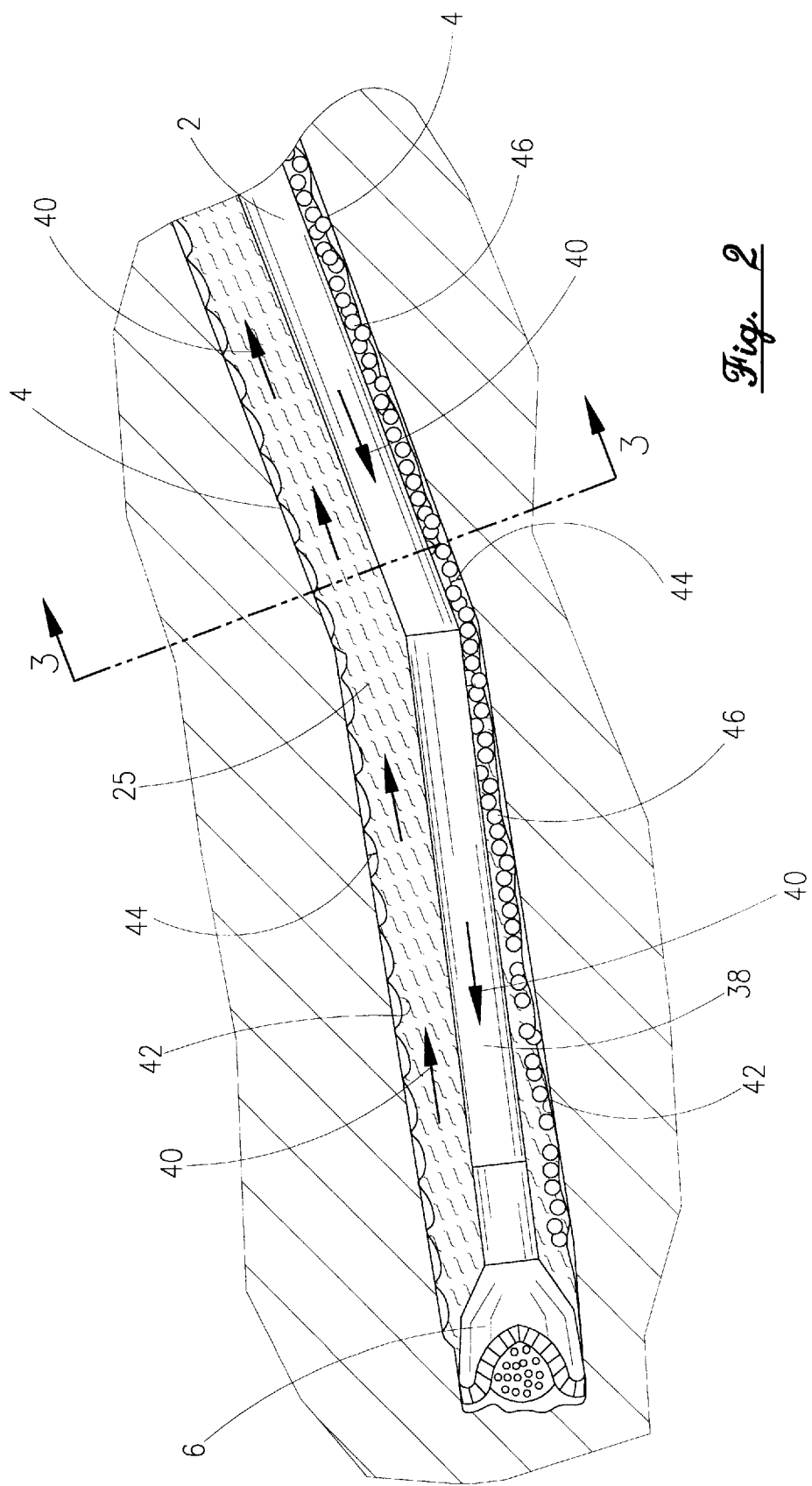
FIG. 2 depicts a deviated bore hole cross-sectional profile with a drill string therein drilling ahead in accordance with the teachings of the present invention.

Referring to FIG. 2, a highly deviated section of the well bore 4 is illustrated. It should be noted that identical numbers in the various figures refer to like components. The drill bit 6 is in the process of drilling ahead, with the bit 6 having associated therewith a bottom hole drilling assembly 7. Thus, in this sequence the flow 40 (represented by the arrows) is through the internal diameter of the drill string 2, through the bit 6 and up the annulus 25. FIG. 2 also depicts the filter cake, represented by the numeral 42. The thickness of the filter cake 42 is represented by the numeral 44. Also shown is the spherical beads 46 that have been spotted to an area experiencing tortuosity within the well bore 4.

Figure 3:
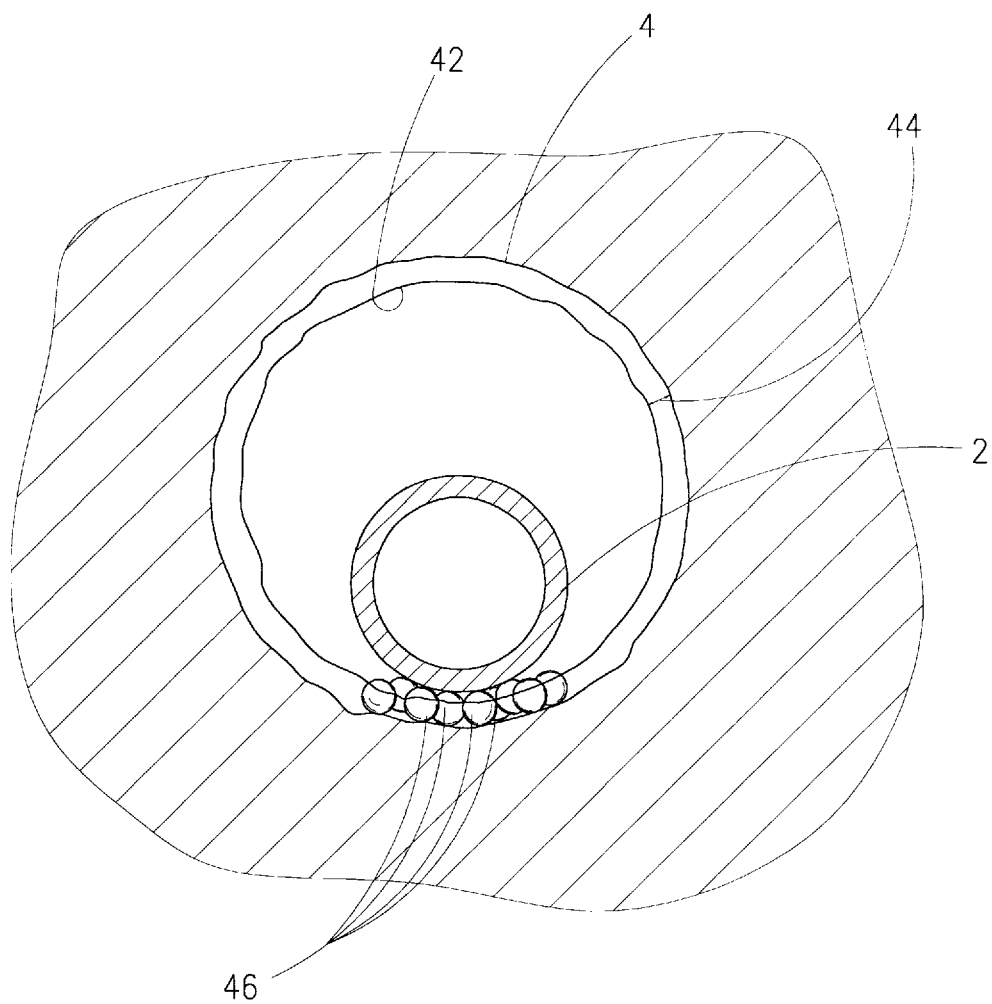
FIG. 3 is a cross-section taken along line A—A of FIG. 2

With reference to FIG. 3, a cross-section taken along line A—A of FIG. 2 is illustrated. It should be noted that FIGS. 1, 2, and 3 are not to scale and are merely representative of the teachings of the present invention. The drill string 2 has been lifted via the spherical beads 46 which are resting on the low side of the bore hole 4. The filter cake 42 has a thickness represented by the numeral 44 and surrounds the bore hole 4 as is well known in the art. Generally, the thickness of the filter cake is less than 800 microns. The spherical beads 46, due to its outer diameter, will penetrate the filter cake (i.e. stick-out of the filter cake) in accordance with the teachings of the present invention.

A method of decreasing the tortuosity of a highly deviated well bore 4 is disclosed. The method comprises providing a drill string 2 having a bottom hole assembly 38. The bottom hole assembly 38 may contain a drilling motor, a directional sub, and a bit member, as is well understood in the art. Generally, the driller pumps a drilling fluid down the drill string 2 as seen in FIG. 2. With the pumping of the drilling fluid, the bit 6 is rotated via the drilling motor. The bottom hole assembly 38 will (due to the nature of the boring through various subterranean formations) collide with the bore hole 4. The drill string 2 will also experience this same interaction with the bore hole 4.

The continued rotation of the bit 6 will create a well bore 4. The driller may build the angle of the well bore 4 by employing techniques known in the art. The driller may also steer the bit 6, particularly when the bottom hole assembly 38 is drilling a substantially horizontal section. Once the driller is within the productive formation, he will attempt to stay within the boundaries by geo-steering. All of this will continue to create, and in fact, exacerbates the tortuosity. The driller may determine the area of greatest tortuosity.

In accordance with the teachings of the present invention, the driller will then have prepared a pill comprising 20–30 ppb of spherical beads. In one embodiment, the beads have a diameter from 800–2500 microns, with the preferred embodiments being between 1500–2000 microns. The 1500–2000 micron preferred embodiment corresponds to a 10–14 mesh seive size. The pill will be pumped into the bore hole to the area of greatest tortuosity. Thereafter, the driller may continue drilling ahead by pumping and placing weight on the bit 6. The spherical beads 46 will generally migrate to the bottom of the bore hole as seen FIG. 2. Thus, as the drill string 2 is advanced, the spherical beads 46 act to reduce the tortuosity by lifting the drill string from the bore hole thereby increasing the penetration rate.

The driller may thereafter prepare a sweep to add to the fluid system which is periodically added to maintain the effect of the spherical beads 46. The sweep would consist of 1–2 sacks (50 to 100 pounds) of spherical beads 46 added per hour. If high torque and drag re-appear, then the driller would run another sweep. Next, the sweep is spotted into the bore hole 4 to the area of greatest tortuosity.

With the use of drilling fluid systems, a usually desirable effect is to build what is known as a filter cake 42. The filter cake 42 has several desirable characteristics that include, but not limited to, the prevention of hole sloughing and deterring the migration of damaging drilling fluid into productive formations. On the other hand, the filter cake has certain disadvantages such as providing an area into which the drill string 2 may become snared, differentially stuck, or increasing the friction between the drill string and the bore hole.

Thus, the method would include pumping the drilling fluid down the drill string 2 so that a filter cake is created, with the filter cake having a thickness of at least 500 microns, and wherein the spherical beads 46 have a diameter greater than 800 microns. It has been found that it is necessary for the spherical beads to penetrate (stick-up through) the filter cake 42 in order to achieve the advantages and features thus claimed.

The invention also discloses a method of reducing tortuosity of a work string 2 within a highly deviated bore hole containing a fluid system. In this embodiment, the driller drills a highly deviated well bore with a coiled tubing work string. At the surface, a pill is prepared comprising of 20–30 ppb of spherical beads. Thereafter, the pill is placed into the fluid stream at the surface, with the pill being pumped through the annulus so that the pill is adjacent the area of greatest tortuosity.

The method further comprises the steps of allowing the pill to settle to the bottom of the bore hole through the filter cake, and then manipulating the coiled tubing string (including axial movement relative to the bore hole) in order to reduce the tortuosity. This can be accomplished by exerting a pulling force on the work string 2 then slacking-off weight. In this embodiment, the fluid system generates a filter cake upon the bore hole and wherein the spherical glass bead has a diameter of at least 800 microns.

A method of increasing the penetration rate by jetting away formation face (sometimes referred to as slide drilling) is also disclosed. The method includes having a drill bit 6 located on a work string 2 in the bore hole having a fluid system. The method comprises the steps of rotating the work string 2 so that the bit 6 drills a horizontal bore hole 4, and thereafter the rotation is terminated. A first capsule is prepared comprising 20 pounds per barrel of a spherical bead, and thereafter, placed into the fluid system. The first capsule is reversed circulated through the annulus 25 so that the capsule is adjacent the horizontal section, and the first capsule is allowed to migrate to the low side of the horizontal bore hole (due to gravitational effect) so that the work string 2 lays on top of the spherical beads 46, as seen in FIG. 3.

Next, the operator would pump the drilling fluid through the bit 6. This time, the bit 6 is not rotating. The drilling fluid exits the jet nozzles of the bit 6 and jets away the formation face so that new bore hole is created. The driller will advance the work string 2 within the newly created bore hole 4 with the aid of the spherical beads that are laying on the low side of the bore hole 4.

The driller may then prepare a second capsule comprising the spherical beads 46, and thereafter, place the second capsule into the fluid system via reverse circulation through the annulus. The second capsule is allowed to migrate to the low side of the horizontal bore hole 4 so that the work string 2 lays on top of the spherical beads 46.

The step may be repeated by the operator pumping the drilling fluid through the bit 6. The drilling fluid exits the jet nozzles of the bit 6 and jets away the formation face so that new bore hole 4 is created. The driller will advance the work string within the newly created bore hole 4 with the aid of the spherical beads 46 that are laying on the low side of the bore hole 4.

The teachings of the present invention are also applicable when the driller is working with concentric work strings (not shown). For instance, if the work being performed is a remedial work over, and the well bore already contains a tubular production string therein, and the work string is a concentric coiled tubing string. The objective may be to perform the remedial work using the coiled tubing to acidize the formation, gravel pack the formation, etc. The method would include encountering a constricted area within a deviated well bore (such as seen at 30 and 31 of FIG. 1). The operator would prepare a sweep comprising 20 ppb of spherical beads, and thereafter, place the sweep into the fluid system.

Next, the operator would pump the sweep through the annulus so that the capsule is adjacent the section experiencing the greatest friction (such as at point 30). Many times, this will be at dog-legs, turns or twist, but in production tubing, the friction may be created by nipple profiles or packers. The sweep is allowed to migrate to the low side of the bore hole so that the spherical beads lay in-between the coiled tubing string and the tubular string. In the preferred embodiment, the beads will contain a diameter between 800–2500 microns preferably between 1500–2000 microns.

The invention also describes a method of running a liner into a well bore. Modern well bores being drilled include the highly deviated wells. Thus, after drilling, the operator will find it necessary to run a liner (sometimes referred to as a "casing string"). Reentry into the well with the liner, and its placement through the turns, twist and dog-legs is difficult. Thus, the method includes running the liner to the point of constriction, and preparing a sweep comprising the spherical beads. The sweep is placed into the fluid system by pumping the sweep through the work string so that the sweep is adjacent the area of constriction. The liner is lowered with the aid of the spherical beads into the well bore, and in particular, through the area of constriction.

In this method, as was the case with the other embodiments, the operator will allow the sweep to migrate to the low side of the bore hole so that the liner lays on top of the spherical beads, and working past the constricted area. It should be noted, the bore hole may still contain a filter cake, with the filter cake having a thickness, and the spherical beads have a diameter of between 800–2500 microns, with the preferred embodiment being 1500–2000 microns.

A method of batch drilling a field is also disclosed. Generally, batch drilling consist of drilling a number of wells from a single location such as an offshore platform. The wells will be drilled by a first drilling rig. As each individual well is drilled to the target level, that well is temporarily abandoned. The target level may correspond to a kick-off point for the future drilling of a substantially horizontal section into a productive hydrocarbon reservoir.

After a batch of wells have been drilled, the operator may for instance demobilize the first rig, and rig-up a second rig. The second rig may be a smaller, specialty rig i.e. coiled tubing unit, snubbing unit, workover rig, etc. The purpose of mobilizing the second rig may be to drill the extended reach portion faster, or more economical, or more efficient. Upon reentry, the driller may many times experience difficulty due to the drill string getting stuck on dog-legs, turns, sloughing shales, etc.

Thus, in accordance with the teachings of the present invention, the first well is drilled utilizing a first drilling rig. Then, a second well is drilled with the first drilling rig. A pill is placed in the first well, with the pill comprising said spherical beads having a diameter of between 800–2500 microns, with the preferred embodiment being 1500–2000 microns. The pill may also be placed in the second well. The pill may be placed via reverse circulation while the drill string is still in the bore hole.

Next, the operator would reenter the first well utilizing the second drilling rig which would be operatively associated with a second type of drill string. The driller would drill a new section of bore hole, which may be a highly deviated section of the first well with the second drilling rig. The pill of spherical beads thus placed will facilitate the reentry of the drill string by serving as a ball bearing and reducing the friction between the drill string and bore hole, particularly upon reentry. As noted earlier, the size of the spherical bead must be large enough to stick-up through (penetrate) the filter cake.

The method would further comprise placing in the second well a pill comprising the spherical beads. The beads may be placed therein by reverse circulating with the first drill string; it should be noted that another method of placing may be reverse circulating with the second drill string, or alternatively, placing the spherical beads at the surface and allowing downward gravity migration. The method would further include reentering the second well with the second drill string and drilling a section (for instance an extended reach well) with the second drill rig. The size of the beads may range from 800 to 2500 micron diameter, with the diameter in the preferred embodiment being 1500–2000 micron.

Changes and modifications in the specifically described embodiments can be carried out without departing from the scope of the invention which is intended to be limited only by the scope of the appended claims.

I claim:

1. A method of decreasing the tortuosity of a highly deviated well bore, the method comprising:

providing a drill string having a bottom hole assembly containing:

a directional sub attached to said drill string; a drilling motor operatively associated with said directional sub; and, a bit responsive to said drilling motor;

pumping a drilling fluid down said drill string;

rotating said bit so that a well bore is created, said rotation developing tortuosity between the drill string and the well bore;

building the angle of inclination so that a deviated section is created;

preparing a pill comprising: at least 20 pounds per barrel of spherical beads, said beads having a diameter of at least 800 microns;

pumping said pill within said well bore to the area of tortuosity;

drilling the horizontal section;

preparing a sweep comprising: 50 pounds of spherical beads, said beads having a diameter of 800 microns;

pumping said sweep within said well bore to said horizontal portion, and wherein the step of pumping the drilling fluid down the drill string includes creating a mud cake upon the well bore, said mud cake having a thickness of at least 1000 microns.

2. A method of reducing tortuosity of a work string within a highly deviated bore hole containing a fluid system, the method comprising the steps of:

drilling a highly deviated well bore with the work string;

preparing a pill comprising of at least 20 pounds per barrel of spherical beads;

placing said pill into the fluid stream at the surface;

pumping said pill through by reverse circulation so that said pill is adjacent the area creating the tortuosity;

allowing said pill to settle to the bottom of the bore hole through the filter cake;

manipulating said work string axially relative to said bore hole in order to reduce said tortuosity; and wherein said fluid system generates a filter cake upon the bore hole.

3. The method of claim 2 wherein said work string is a coiled tubing string.

4. A method of increasing the penetration rate of a work string containing a drill bit located in a bore hole having a fluid system without rotation of said drill bit, the method comprising the steps of:

rotating said work string so that said bit rotates and drills a substantially horizontal bore hole;

terminating the rotation of said work string so that said bit is no longer rotating;

preparing a first capsule comprising a 20 pounds per barrel of a spherical bead;

placing said first capsule into the fluid system;

pumping said first capsule through said work string so that said capsule is adjacent the horizontal section;

allowing said first capsule to migrate to the low side of said substantially horizontal bore hole so that said work string lays on top of said spherical beads;

pumping said fluid system through said bit without the rotation of said bit;

jetting away a formation face so that a new bore hole is created;

advancing said work string within said new bore hole.

5. The method of claim 4 further comprising the steps of:

preparing a second capsule comprising said spherical beads;

placing said second capsule into the fluid system;

pumping said second capsule through said work string so that said second capsule is adjacent the horizontal section;

allowing said second capsule to migrate to the low side of said substantially horizontal bore hole so that said work string lays on top of said spherical beads.

6. The method of claim 5 further comprising the steps of:

pumping said fluid system through said bit without the rotation of said bit;

jetting away a formation face so that a further bore hole is created;

advancing said work string within said further bore hole.

7. A method of concentrically lowering a coiled tubing string through a tubing string comprising the steps of:

providing the tubing string within a highly deviated well bore;

providing the coiled tubing string concentrically within said tubing string;

lowering said coiled tubing string;

encountering a constricted area that includes the metal of the tubing string contacting the metal of the coiled tubing string;

preparing a sweep, said sweep comprising 20 pounds per barrel of a spherical bead and wherein said sweep comprises:

a bead having a diameter of at least 800 microns;

placing said sweep into the fluid system;

pumping said sweep through said tubing string so that said capsule is adjacent the constricted area;

allowing said sweep to migrate to the low side of said horizontal bore hole so that said work string lays on top of said spherical beads;

working past said constricted area.

8. A method of running a casing liner comprising the steps of:

providing a bore hole, said bore hole having a deviated section containing a point of constriction and wherein said bore hole has a formation face;

running the casing liner into said bore hole to encase said bore hole and encountering said point of constriction;

preparing a sweep, said sweep comprising 20 pounds per barrel of a spherical bead;

placing said sweep into the fluid system;

pumping said sweep through said work string so that said sweep is adjacent the deviated section;

placing said liner in said bore hole;

allowing said sweep to migrate to the low side of said deviated section so that said work string lays on top of said spherical beads;

axially manipulating said casing liner in order to work past said constricted area.

9. The method of claim 8 wherein said bore hole has a filter cake having a thickness of at least 500 microns, and said spherical beads have a diameter of at least 800 microns.

10. A method of batch drilling a field comprising:

drilling a first well bore with a first drill string from a first drill rig;

drilling a second well bore with said first drill string with said first drill rig;

placing in said first well bore a first pill, said first pill comprising spherical beads;

demobilizing said first drill rig;

re-entering said first well bor with a second drill string from a second drill unit;

drilling a deviated well bore from said first well bore with said second drill string;

placing in said second well bore a second pill, said second pill comprising spherical beads;

re-entering said second well bore with said second drill unit;

drilling a deviated bore from said second well with said second drill unit.

11. The method of claim 10 wherein said spherical glass beads comprise a spherical glass bead having a diameter of at least 800 microns.

12. The method of claim 11 wherein said second drill rig is a coiled tubing unit having a drilling bottom hole assembly.

* * * * *